Dec. 17, 1968  V. J. RIGOLINI  3,416,425

CAMERA

Filed May 25, 1965  9 Sheets-Sheet 1

Dec. 17, 1968  V. J. RIGOLINI  3,416,425

CAMERA

Filed May 25, 1965  9 Sheets-Sheet 2

Dec. 17, 1968  V. J. RIGOLINI  3,416,425
CAMERA
Filed May 25, 1965  9 Sheets-Sheet 6

Dec. 17, 1968   V. J. RIGOLINI   3,416,425
CAMERA
Filed May 25, 1965   9 Sheets-Sheet 8

Dec. 17, 1968    V. J. RIGOLINI    3,416,425
CAMERA
Filed May 25, 1965

United States Patent Office 3,416,425
Patented Dec. 17, 1968

3,416,425
CAMERA
Venerio J. Rigolini, Brooklyn, N.Y., assignor to Whitehouse Products Inc., Brooklyn, N.Y., a corporation of New York
Filed May 25, 1965, Ser. No. 458,593
17 Claims. (Cl. 95—31)

ABSTRACT OF THE DISCLOSURE

A slidable and pivotable metering plate, in a photographic camera, which locks the film-winding mechanism after the film has advanced sufficiently to take a new picture, prevents double exposures from being taken before this mechanism becomes locked, provides some slack in the film before the shutter trips and unlocks the film-winding mechanism after each picture is taken. In addition, the camera includes a mechanism for changing the shutter speed upon insertion of a flash bulb in the camera socket and for ejecting spent flash bulbs from the camera.

---

The present invention relates to cameras, and more particularly to cameras intended to be used with film cartridges or cassettes.

Film cartridges are available on the market today and avoid the loading problems commonly encountered with roll film cameras. An example of such a film cartridge is found in United States Design Patent No. 195,746, issued July 23, 1963, to Hubert Nerwin. A roll film for the cartridge of the Newwin design patent is illustrated in United States Patent 3,086,862, issued Apr. 23, 1963, to Eagle et al. A typical cartridge construction and a typical camera construction for use therewith are illustrated in United States Patent No. 3,138,084 issued June 23, 1964, to D. C. Harvey.

The principal object of this invention has been to provide an improved camera construction especially adapted for use with film cartridges.

Another object of the invention has been to provide such a camera construction which is simple, inexpensive and reliable.

Still another object of the invention has been to provide such a camera for use with a cartridge that is adapted to be enclosed within the housing of the camera.

A further object of the invention has been to provide such a camera in which a film strip is employed having metering perforations along an edge thereof, and in which film metering is accomplished efficiently with a minimum of parts.

At still further object of the invention has been to provide such a camera in which double exposure is prevented.

In one aspect of the invention, a camera may comprise a central housing member having a front cover rigidly attached thereto and to which at least part of the lens and light-admitting means is attached. A back cover may include a portion that is hinged to the central housing and it may be held closed by a quick release device. The other part of the back cover may be held onto the central housing by screw means, and it may enclose a pocket for the reception of batteries for a flash mechanism.

In another aspect of the invention, the back of the central housing may include spaced, parallel pocket means on each side of the lens, for the reception of a film cartridge having hollow, parallel spaced compartments adapted to fit within the pockets, said compartments being joined by a flat, hollow body through which the film passes as it is unwound from one spool onto the other.

In still another aspect of the invention, a winding device may be provided directly above the pocket containing the cartridge compartment within which the take-up spool is located. The winding device may comprise a shaft journaled in a bearing in the top of the main housing. The lower end of the shaft may have a ratchet with peripheral teeth and an integral collar journaled thereon. The collar has a disk splined to it that is provided with ratchet teeth on its bottom face and is spring-urged away from the other ratchet. The construction is such that with the back cover open, loading a film cartridge into the camera and snapping the back cover closed causes the face ratchet disk to move toward the peripheral ratchet and then to move away from it into engagement with corresponding face teeth on the top of the take-up spool of the film cartridge. An oscillatable crank may be connected to the top of the winding shaft and a spring ratchet toothed arrangement permits unidirectional rotation of the take-up spool upon oscillating the crank, there being a spring to return the crank to its initial position after each forward movement of the crank.

In a still further aspect of the invention, metering mechanism may be provided for ensuring that the film is properly framed for each exposure and to prevent winding action until the framed portion of the film has been exposed. The metering mechanism may comprise a reciprocable and oscillatable plate element that is pivoted on the winding shaft through an elongated hole in the plate element for permitting the reciprocable movement while still permitting slight oscillatable movement of the plate element. The plate element may include oppositely extending finger portions, one of which rests on the edge of the film and the other cooperates with shutter release mechanism. A spring normally urges the plate element away from the winding shaft and in a counterclockwise direction so that the upper end of the film engaging finger will move into a metering slot along the film edge as it moves over the retracted film engaging finger. The construction is such that as the winding shaft is repeatedly oscillated, the film unwinds from one spool onto the take-up spool until a slot in its edge receives the film-engaging finger whereupon it is moved toward the winding shaft until a tab on the plate engages the peripheral teeth of the ratchet of the winding device, stopping further action of the latter.

In a still further aspect of the invention, means may be provided for preventing double exposure of any frame of the film. It may comprise cam means on the shutter mechanism that cooperates with the metering plate and blacklash means in the winding mechanism to positively withdraw the finger of the metering plate from within the slot in the edge of the film, the spring means then moving the metering plate so that the tab thereon moves away from the peripheral ratchet teeth of the winding means, releasing it for further action to advance the film to another frame. In the retracted position of the metering plate, tab means thereon overlies a finger on the shutter mechanism, preventing the actuation of the shutter until an unexposed frame of the film has been properly advanced as explained above, thus preventing double exposure of any frame of the film.

In still another aspect of the invention, the shutter mechanism may include dual shutters or a single shutter; in the latter case, means may be provided for varying the time of exposure. The time of exposure is increased when a flash is to be taken. It may comprise linkage that increases the throw of the shutter when a flash bulb is mounted within the socket therefor.

Other and further objects, features and advantages of the invention will become apparent from the following description taken in connection with the appended drawings, in which:

Figure 9:
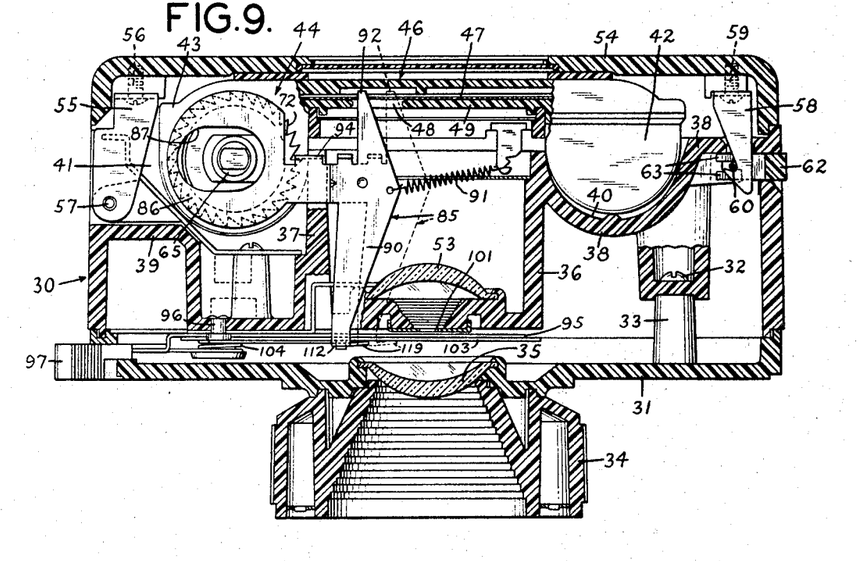
FIG. 9 is a sectional plan view taken substantially along line 9—9 of FIG. 2.

Referring now to the drawings, and particularly to FIGS. 1 to 17, the principles of the invention are shown as applied to a camera including a central body portion 30 to which a front cover 31 is rigidly attached by screws 32 (FIG. 9), only one being shown, threaded into a boss 33 integral with the inside of the front cover 31. Front cover 31 supports a conical, light-admitting member 34 and a lens 35, all as is well known in the art.

Figures 14, 15:
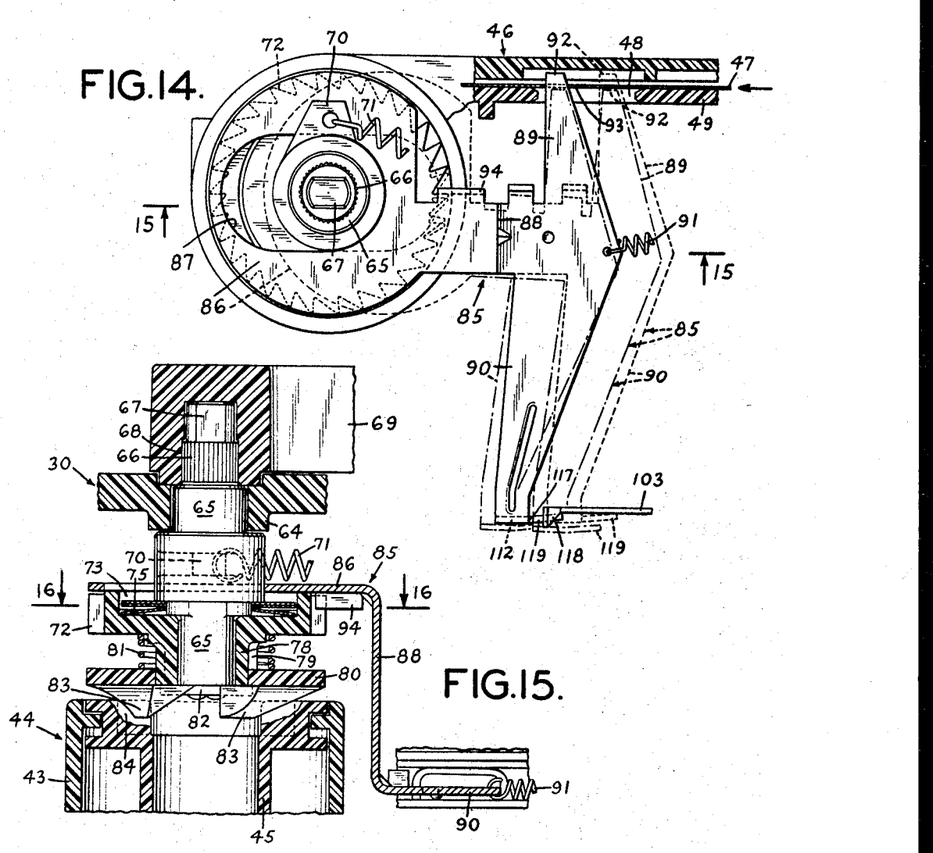
FIG. 14 is an enlarged plan view of the film metering plate showing its operative relationship to the film winding mechanism.
FIG. 15 is a sectional view taken substantially along line 15—15 of FIG. 14.

The main body 30 may include walls 36, 37, 38 and 39 (FIG. 9) which form various compartments for housing certain elements of the camera mechanism. The walls 37 and 38 provide compartments 40 and 41 which receive the spaced ends 42, 43 of a film cartridge 44. The end 42 contains the unexposed rolled film, and the end 43 contains the take-up spool 45 (FIG. 15). The ends 42, 43 are joined by a flat, hollow portion 46 through which the film 47 is threaded from the unexposed reel to the take-up spool 45, past a film metering opening 48 in a front wall 49 of the flat portion 46 of the cartridge.

Figure 10:
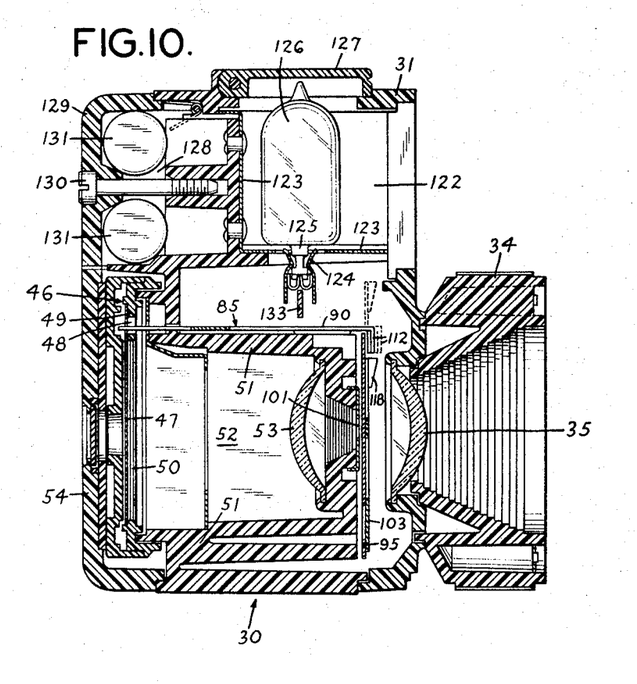
FIG. 10 is a sectional elevational view taken substantially along line 10—10 of FIG. 1.
Figure 11:
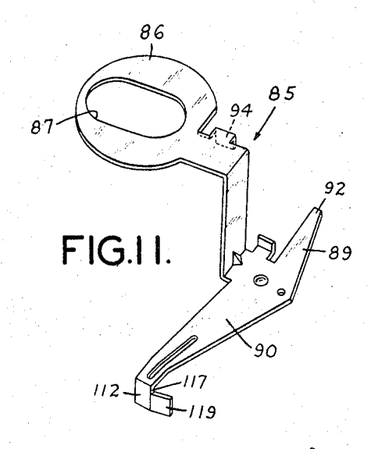
FIG. 11 is a perspective view of the film metering plate.
Figure 13:
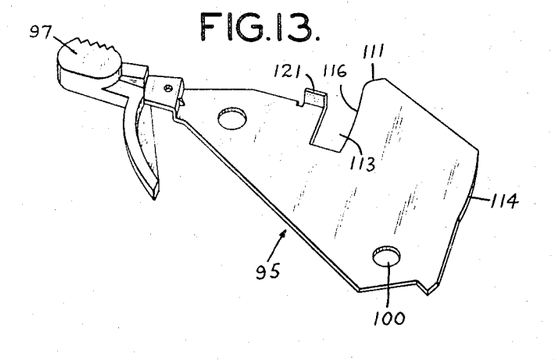
FIG. 13 is a perspective view of the rear shutter with the exposure knob attached.

Referring to FIG. 10, the front wall 49 of the flat portion 46 of cartridge 44 includes a window 50 that is aligned with a wall 51 of the main body 30, forming a tubular compartment 52, at the forward end of which a lens 53 is mounted that cooperates with lens 35 to form the image on the film 47 when it is framed within window 50.

Figure 1:
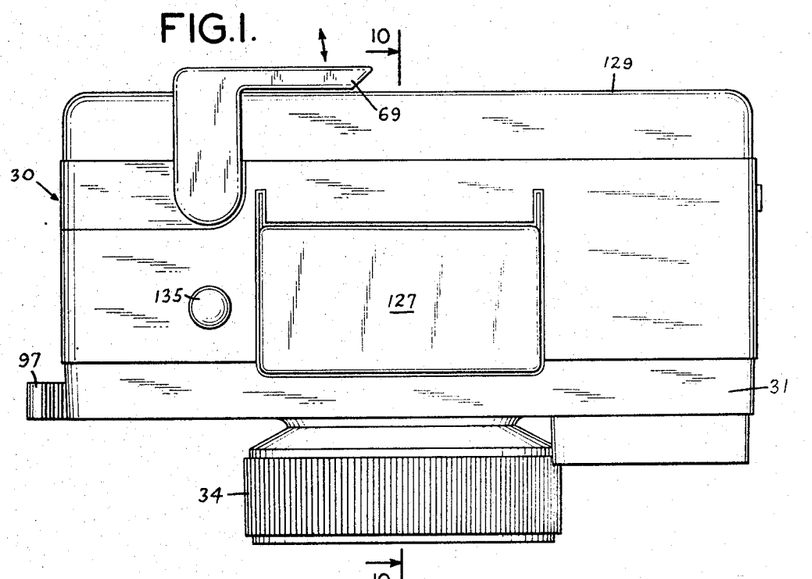
FIG. 1 is a top plan view of a camera to which the principles of the invention have been applied.
Figure 2:
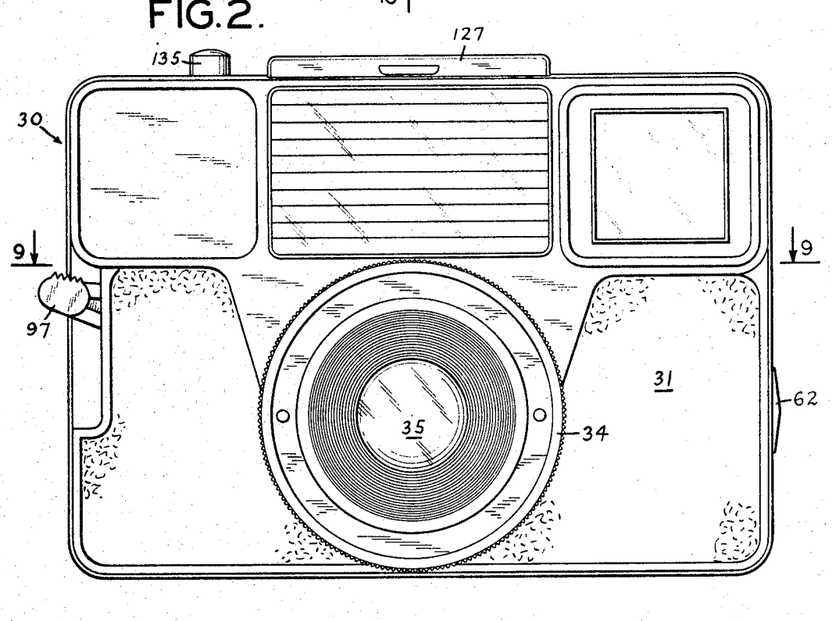
FIG. 2 is a front elevational view of the camera of FIG. 1.
Figure 3:
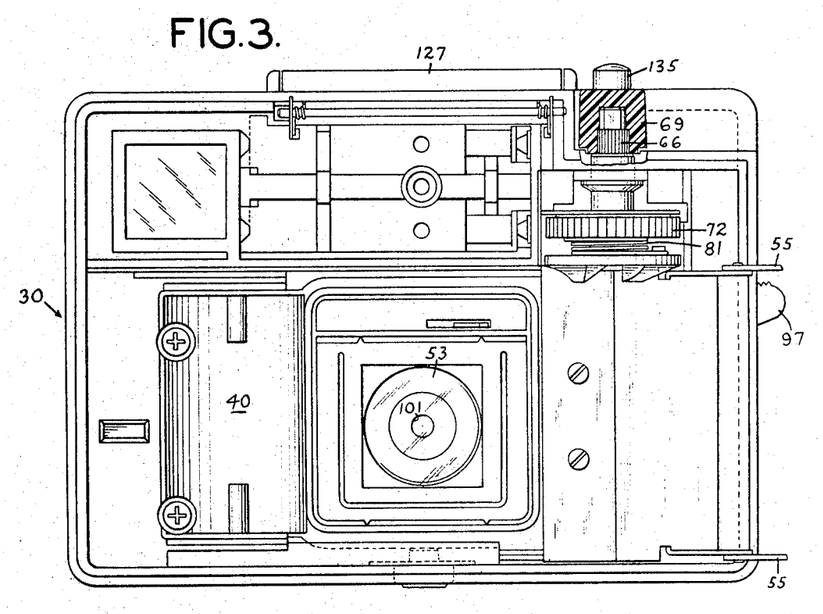
FIG. 3 is a rear elevational view of the camera of FIG. 1, with the rear cover removed.
Figure 4:
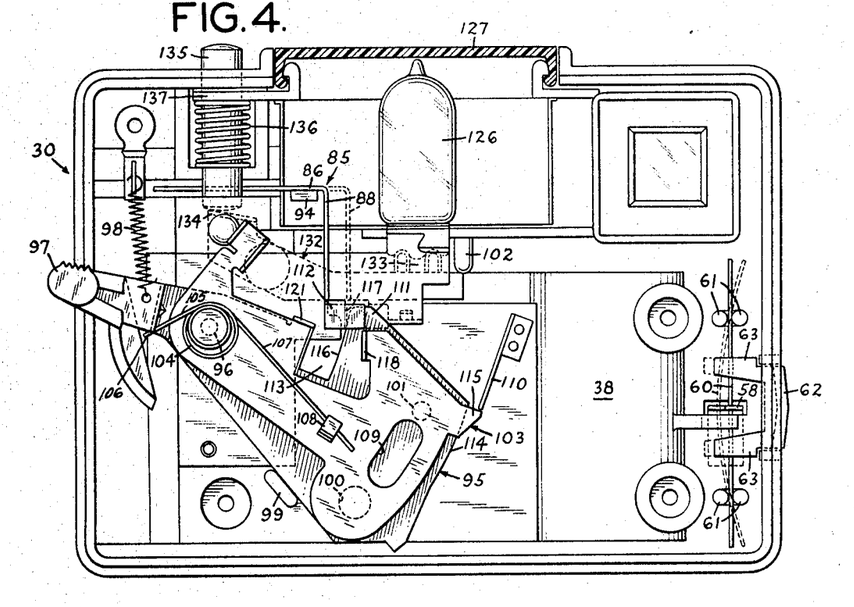
FIG. 4 is a front elevational view of the camera of FIG. 1, with the front cover removed and with the shutter mechanism at rest.
Figure 5:
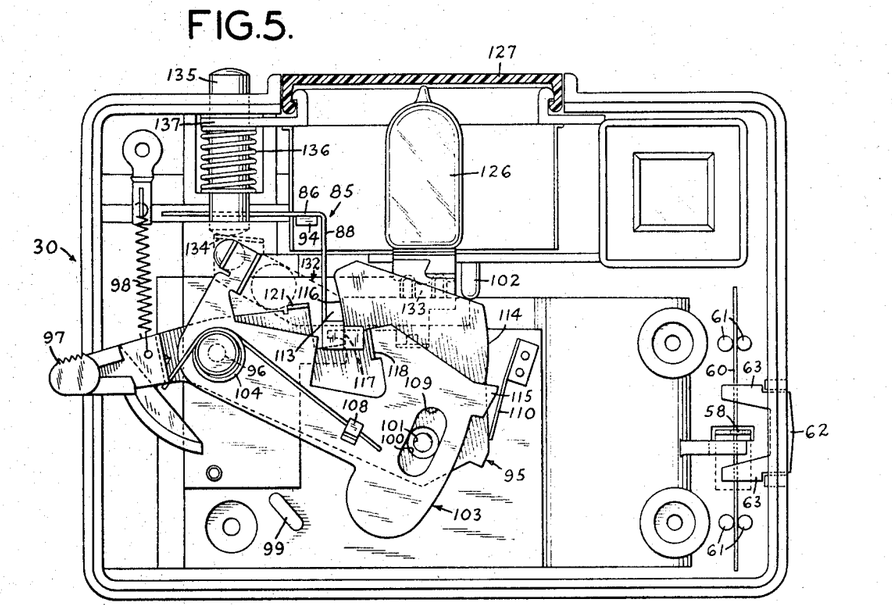
FIG. 5 is a view similar to FIG. 4, showing the shutter mechanism in its position when an exposure is actually made.
Figure 6:
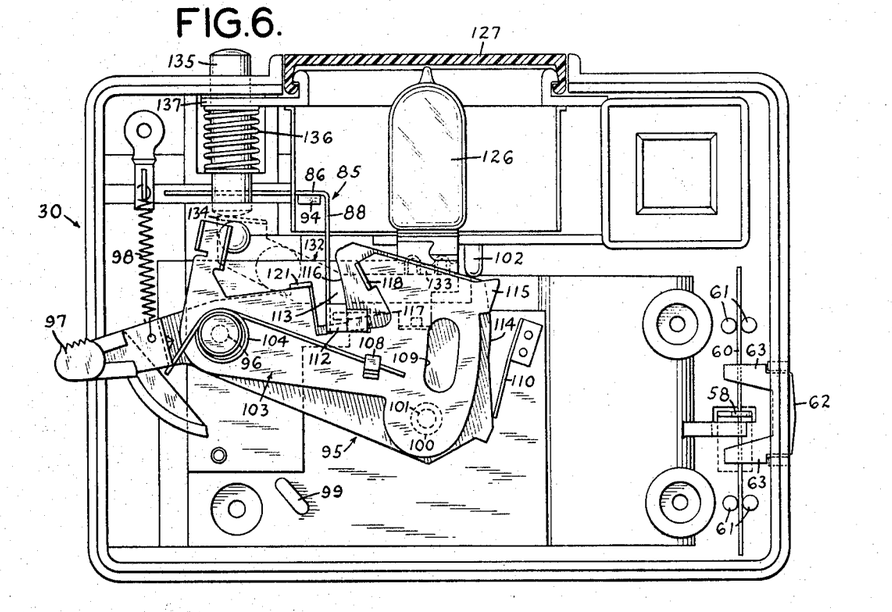
FIG. 6 is a view similar to FIG. 4, showing the shutter mechanism after the exposure has been completed but before the shutter returns to its rest position.
Figure 7:
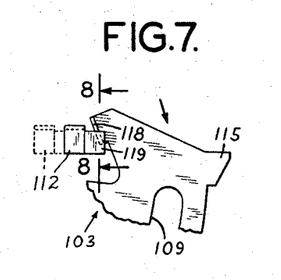
FIG. 7 is a fragmentary view of the front shutter, showing the double exposure prevention tab thereon.
Figures 8, 12:
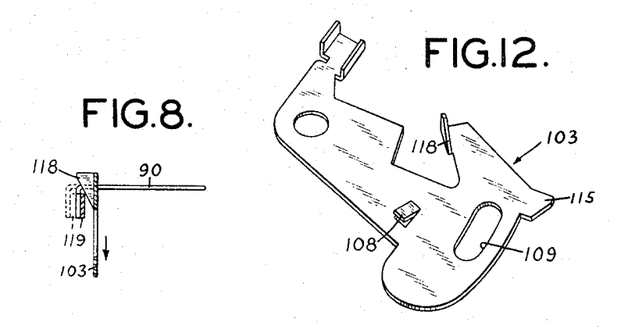
FIG. 8 is a view taken substantially along line 8—8 of FIG. 7.
FIG. 12 is a perspective view of the front shutter.

A back cover 54 may have fastened to its inside surface a pair of spaced brackets 55 by means of screws 56 (only one being shown in FIG. 9), the brackets being pivoted on a shaft 57 mounted within the main body 30. The opposite end of the back cover 54 may support a latch 58 that is fixed to the inside of cover 54 by a screw 59. Latch 58 is adapted to cooperate with a resilient rod 60 mounted between four posts 61 (FIG. 4). A pushbutton 62 may extend through the side wall of the main housing 30. It may include legs 63 that engage rod 60 in a manner such that upon depressing button 62, rod 60 is displaced from latch 58, permitting the hinged opening of the back cover 54 so as to replace the cartridge 44 when all of the film therein has been exposed.

Referring to FIG. 15, the top wall of the main housing 30 may include a bearing 64 in which a shaft 65 is journaled. The upper end of shaft 65 is provided with a knurl 66 and a noncircular end 67 that mate with corresponding portions within a socket 68 of a winding lever 69 that is located above the top of main housing 30. Shaft 65 has a lever 70 extending radially therefrom, the outer end of which is connected to one end of a spring 71 and the opposite end of which spring is anchored in the interior of housing 30. The lever 69 is used manually to turn shaft 65 counterclockwise a predetermined distance (FIG. 14), and spring 71 returns the shaft 65 by turning it in a clockwise direction.

Figures 16, 17:
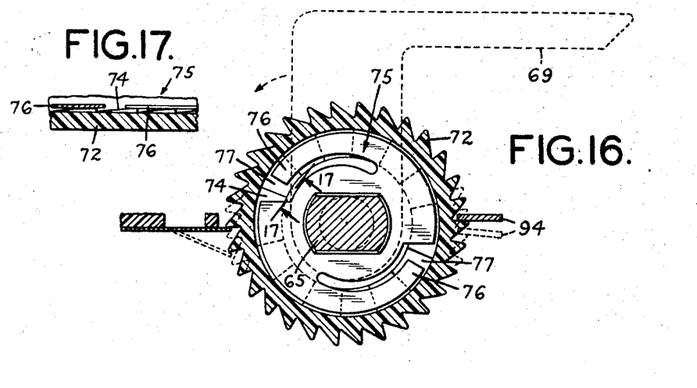
FIG. 16 is a sectional view taken substantially along line 16—16 of FIG. 15.
FIG. 17 is a sectional view taken substantially along line 17—17 of FIG. 16.

The lower end of shaft 65 journals a peripherally toothed ratchet 72. It includes a counterbored portion 73 on the bottom face of which ratchet teeth 74 are formed (FIG. 16). A resilient pawl device 75 may be fixed to shaft 65 and it may include spring teeth 76 that cooperate with face ratchet teeth 74. The arrangement is such that an amount of backlash equal to the space of one of the peripheral teeth of ratchet 72 is provided between teeth 76 and 74 as represented by the spaces 77 (FIG. 16).

The ratchet 72 also includes a collar portion 78 having a spline 79 thereon for receiving a mating spline on a disk 80. A spring 81 between ratchet 72 and disk 80 urges the latter downwardly against an abutment 82 fixed to the lower end of shaft 65. The lower face of disk 80 is provided with face ratchet teeth 83 that are adapted to coact with mating teeth 84 on the upper end of the take-up spool 45. The construction and arrangement of the parts are such that with the back cover open, a film cartridge can be loaded, and as the back cover 54 is closed, the teeth 83 snap into contact with teeth 84 so that upon turning of lever 69 counterclockwise through 90° against the action of spring 71, the cooperation between teeth 76 and 74 causes the turning of take-up spool 45 to draw the film 47 from the loaded spool.

In order properly to frame the film in the window 50 of the cartridge, suitable film metering mechanism is provided. It may comprise a plate 85 including an upper portion 86 that has an elongated slot 87 therein through which shaft 65 extends, thus permitting oscillatable movement about the axis of shaft 65 as well as radial reciprocable movement by virtue of the slot 87. Plate 85 includes a portion 88 at right angles to portion 86 and oppositely extending finger portions 89 and 90 (FIG. 14).

A spring 91 anchored within housing 30 acts to turn plate member 85 in a counterclockwise direction about the axis of shaft 65 and to a position as shown in dot and dash lines (FIG. 14) where the upper end 92 of finger 89 contacts the edge of the film 47. Film 47 is provided with slots 93 spaced along its edge in line with the finger portion 92. Accordingly, as the lever 69 is repeatedly oscillated, the film moves from right to left (FIG. 14) until a slot passes over end 92, whereupon spring 91 causes end 92 to pass into the slot. Continued operation of lever 69 moves film 47, and with it plate 85 through the engagement of end 92 of finger 89 in slot 93.

The upper portion 86 of plate 85 includes a pawl 94 (FIG. 15) which, when plate 85 has been moved an amount properly to frame the next succeeding portion of film 47 in window 50, engages a tooth of the ratchet 72, thereby prevening further action of lever 69 and consequently further movement of film 47.

The shutter mechanism of the species of FIGS. 1 to 17 may comprise a rear shutter 95 that is pivotally mounted on a pin 96 and may include a finger trip element 97. A spring 98 normally urges the rear shutter 95 in a clockwise direction against an abutment 99 within housing 30. The rear shutter includes an aperature 100 that becomes aligned with an aperture 101 (FIG. 10) that passes light from lens 35 to lens 53, when the rear shutter strikes an abutement 102 in housing 30.

The shutter mechanism also includes a forward shutter 103. Shutter 103 is likewise pivotally mounted on pin 96, and a coil spring 104 is mounted on pin 96 having one leg 205 contacting a point 106 on trip element 97, and another leg 107 contacting a lug 108 on the forward shutter 103. The forward shutter 103 may also include an elongated aperture 109 that effects the actual exposure of the film as it passes over aperature 101 when aperture 100 is aligned therewith. At rest position, forward shutter 103 is held in its lower position by a spring element 110. Rear shutter 95 includes a surface 111 (FIG. 13) that abuts an area 112 on the lower end of the finger 90 of metering plate 85 (FIG. 11) when the plate 85 is in its retracted position, thus preventing actuation of the shutter mechanism and hence preventing double exposure.

When, however, the film has advanced the metering plate 85 to cause lug 94 to engage a tooth on ratchet 72, the area 112 is moved to a position such that a slot 113 in shutter 95 clears the abutment area 112 and the shutter pivots counterclockwise upon depression of trip element 97. As rear shutter 95 pivots counterclockwise, a cam surface 114 thereon acts on spring abutment 110, forcing it counterclockwise, and builds up an increased spring force in spring 104, tending to pivot forward shutter 103 counterclockwise about pivot 96. The counterclockwise movement of spring abutment 110 releases a protuberance 115 on forward shutter 103 when aperture 100 is aligned with aperture 101, whereupon forward shutter 103 pivots counterclockwise through the position shown in FIG. 5, exposing the film frame, to the position shown in FIG. 6.

When the film 47 moves the metering plate toward ratchet 72, lug 94 contacts a tooth thereon and stops the winding movement with the contact at the outer extremity of a ratchet tooth. When rear shutter 95 moves counterclockwise, a cam surface 116 thereon acts on a surface 117 adjacent area 112 on the lower end of finger portion 90, forcing plate 85 farther toward the axis of shaft 65 and causing the ratchet 72 to move reversely through the space of about one tooth thereon. This provides slack in the film 47 for a purpose to be described.

At the end of the counterclockwise movement of the forward shutter 103, a tab 118 thereon hits an inclined tab 119 at the bottom of finger 90 and pivots the plate 85 about the axis of shaft 65 so as to withdraw the upper end 92 of finger 89 from the slot 93 in the film 47. Immediately, spring 91 retracts plate 85 to its initial position with the end 92 of finger 89 in contact with the edge of film 47, in position to pass into the next succeeding slot 93 in the edge of film 47.

Upon release of the trip element 97, spring 98 turns rear shutter 95 clockwise about pin 96. Rear shutter 95 includes a tab 121 that overlies the top edge of forward shutter 103, so that as rear shutter 95 pivots clockwise, it pivots the forward shutter 103 clockwise such that the aperture 101 is not opened during the return movement of the shutters to their rest positions. As this occurs, protuberance 115 on forward shutter 103 passes spring abutment 110 and is cocked by it, while rear shutter 95 moves clockwise until its lower edge strikes abutment 99.

Referring again to FIGS. 4 and 10, the main housing 30 includes a compartment 122 centrally of the camera and above the light-admitting member 34. The front wall of the front cover 31 in front of compartment 122 is provided with a window, and the inner walls of compartment 122 are lined with a highly reflective material 123. The bottom wall of compartment 122 includes a socket 124 adapted to receive the conductive end 125 of a flash bulb 126. Access to compartment 122 is through a door 127 hinged to the top of the housing 30 and covering an opening leading into compartment 122.

Behind compartment 122 a battery compartment 128 may be located. It may be covered by a cover 129 forming a separate part of the rear cover 54. Cover 129 is fixed to the housing 30 by a screw 130. It clamps two batteries 131 within compartment 128, and they make electrical contact with socket 124 upon operation of shutter release lever 97 as is well known in the art.

Referring to FIG. 4, a lever 132 is pivotally mounted within housing 30. Its one end 133 contacts the bottom of flash bulb 126 while the other end 134 rests against a plunger 135 that extends to the top exterior of housing 30. A spring 136 normally acts on a collar 137 fixed to plunger 135, urging it upwardly while the flash bulb base maintains the end 134 in contact with the bottom of plunger 135. When a flash exposure has been taken, the cover 127 is opened, the plunger 135 pressed downwardly, whereupon the spent bulb is ejected from socket 124 and with the camera inverted, it falls out of compartment 122 without requiring the operator to touch the hot bulb.

Referring to FIGS. 18 to 27, the principles of the invention are shown as applied to a camera of modified construction from that shown in FIGS. 1 to 17. The camera in FIG. 18 includes a center or main housing 138, a back cover 139 and a front cover 140. These elements are essentially the same as corresponding elemetns in FIG. 1 and, therefore, wil not specifically be described.

In the embodiment shown in FIGS 18 to 27, means are provided for varying the time of exposure between normal daylight exposure and flash exposure. A greater time for flash exposure is provided than for daylight exposure.

Figures 18, 23:
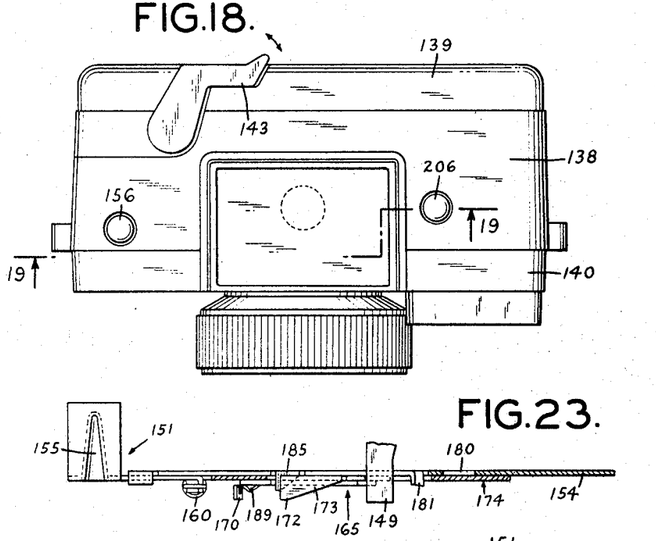
FIG. 18 is a top plan view of a camera to which a modified form of the principles of the invention have been applied.
FIG. 23 is a sectional view taken substantially along line 23—23 of FIG. 19.
Figure 24:
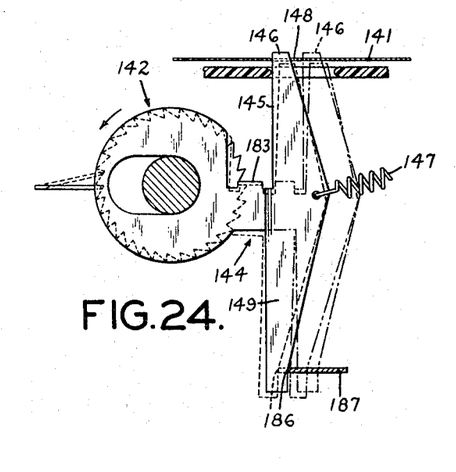
FIG. 24 is a view of the metering plate and its operational relationship with the winding mechanism.
Figure 25:
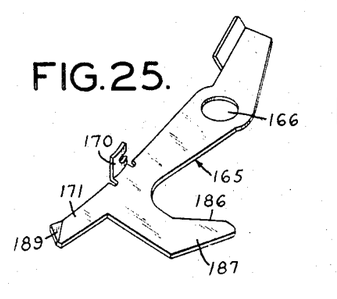
FIG. 25 is a perspective view of the shutter trip leg.
Figure 26:
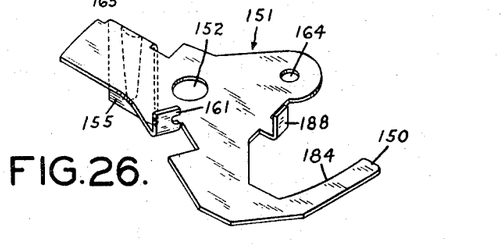
FIG. 26 is a perspective view of the shutter trip lever.
Figure 27:
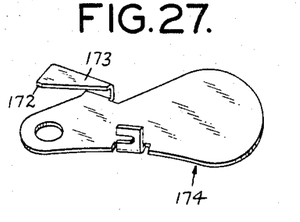
FIG. 27 is a perspective view of the shutter.

Referring to FIG. 24, the camera of FIG. 18 includes a cartridge similar to that of FIG. 1 in which a film 141 is drawn from a spool containing unexposed film to a take-up spool by a winding mechanism 142 similar to that shown in FIGS. 14 and 15, and it is operated by a lever 143 similar to lever 69. A metering plate 144 includes a finger portion 145, the end 146 of which is caused to resiliently contact the edge of film 141 by means of a pring 147. Normally it is retracted by spring 147 to its rightwardmost dot and dash line position until a slot 148 on the edge of film 141 receives the end 146 of finger 145. Prior to this action, a leg 149 of plate 144 overlies the end 150 (FIG. 19) of a shutter release lever 151.

Figure 19:
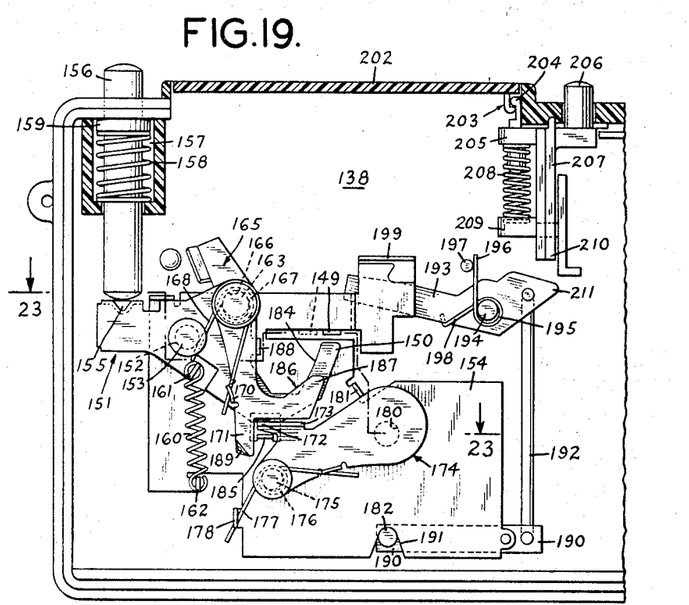
FIG. 19 is a sectional view taken substantially along line 19—19 of FIG. 18, showing an impact shutter arrangement in its rest position.

The shutter release lever 151 (FIG. 26) includes a hole 152 that journals lever 151 on a pivot pin 153 fixed to a plate 154 rigidly mounted within the housing 138. The lever 151 may have a right angularly extending portion 155 that abuts the lower end of a plunger 156. Plunger 156 extends through a compartment 157 and out of the top of main housing 138. A spring 158 in compartment 157 acts against a collar 159 on plunger 156, urging it into its upper position as shown in FIG. 19. A spring 160, having its one end connected to a tab 161 and its other end anchored to a tab 162 on plate 154, acts to turn lever 151 clockwise about pivot 152 to maintain portion 155 in abutting relation with the lower end of plunger 156.

A pin 163 on lever 151 extends through a hole 164 therein. A trip leg 165 includes a hole 166 through which pin 163 extends. A trip leg 165 is urged in a counterclockwise direction by a coil spring 167 on pin 163. Its one leg 168 acts against pin 152, and its other leg 169 acts against a tab 170 on the leg 165.

The lower end of leg 165 includes a heel-shaped portion 171 that is adapted to cooperate with the edge 172 on a tab 173 of a shutter 174. The shutter is pivotally mounted on a pin 175 attached to plate 154. A spring 176 is coiled about pin 175. Its one leg 177 acts against a tab 178 on plate 154, and its other leg 179 is caught in a notch in the edge of shutter 174 opposite that containing edge 172.

In FIG. 19, shutter 174 is shown in its rest position, blocking the passage of light through an aperture 180 through which light is admitted during the exposure of the film. The counterclockwise extent of movement of the shutter 174 is limited by a tab 181 on plate 154, and its movement in a clockwise direction is limited by a pin 182 to be described later. The exposure of the film is determined by the travel of shutter 174 from a point in its clockwise movement where it uncovers aperture 180 to a point in its couneterclockwise movement in covering said aperture.

In the position of the parts shown in FIG. 19, the abutment 150 on trip lever 151 is aligned with a double-exposure prevention finger 149 of plate 144 (FIG. 24), indicating that the winding mechanism must be operated to frame an unexposed portion of the film. Accordingly, actuating lever 143 causes film 141 to move from right to left until the end 146 of finger 145 engages a slot 148 on the film edge. Continued movement of film 141 to the left moves plate 144 to the left until a tab 183 thereon engages the ratchet teeth of winding device 142, preventing its further operation. This moves finger 149 to its dotted position (FIG. 19) so that plunger 156 can be depressed, thus turning trip lever 151 counterclockwise to the position shown in FIG. 20. A cam surface 184 on the side edge of abutment 150 forces finger 149 and plate 144 further leftward (FIG. 24), causing the winding device to move in a reverse direction about the distance of one of its ratchet teeth as explained in connection with the species shown in FIG. 16, thereby providing some slack in the film 141. At the same time, the heel portion 171 is moved counterclockwise to a point clearing a tab 185 on plate 154, energy having been stored up in spring 167 prior to heel portion 171 clearing tab 185. Immediately upon such clearing, trip leg 165 snaps counterclockwise with considerable force, striking the edge 172 on shutter 174 and pivoting it clockwise against the action of spring 176 until it is stopped by pin 182 (FIG. 21). Immediately, the stored-up energy in spring 176 returns shutter 174 to the position in FIG. 19 against tab 181.

As spring 167 continues the counterclockwise movement of trip leg 165, a cam surface 186 on the edge of a toe portion 187 thereof acts on finger 149 to pivot plate 144 about the axis of the winding device 142 to release the end 146 from the slot 148 so that spring 147 can return plate 144 to its rest position and release the winding device 142 for further action, all as previously described in relation to FIG. 14.

In the meantime, spring 160 moves trip lever 151 clockwise and a tab 188 on its acts on the edge of leg 165 to return it to its rest position. A turned corner 189 on the lower end of heel portion 171 acts to permit the heel portion 171 to pass over abutment 172 on shutter 174. The parts are now in the condition shown in FIG. 19 ready for the winding mechanism 142 to be actuated to frame an unexposed portion of film 141, all as previously described.

The preceding description of FIGS. 18 to 27 deals with the operation of the camera with daylight exposure. When a flash exposure is desired, a longer exposure time is required in order to ensure the flash bulb being triggered when the aperature 180 is uncovered.

Figure 20:
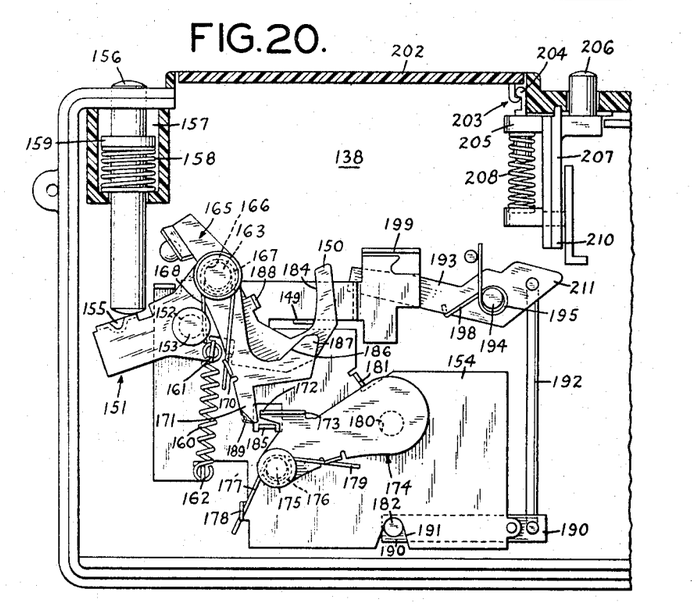
FIG. 20 is a view similar to FIG. 19, showing the action of the shutter release mechanism and the winding mechanism interlock.
Figure 21:
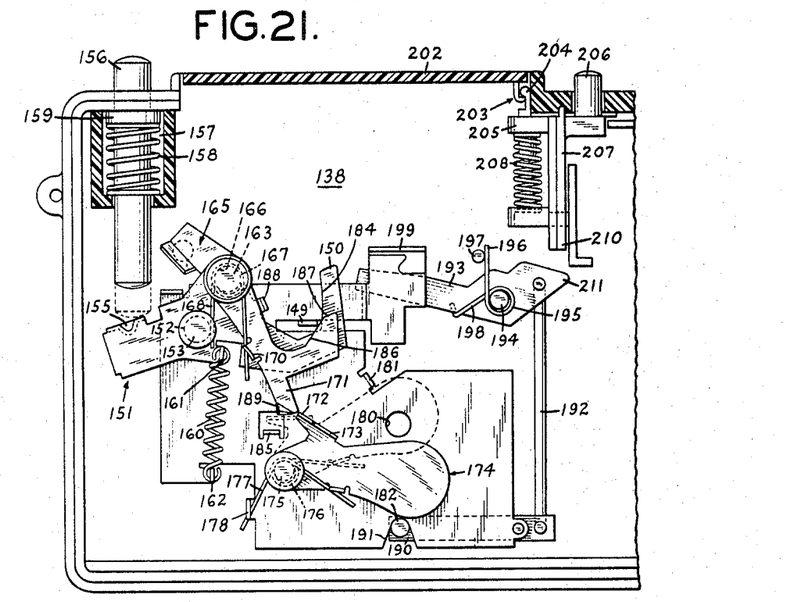
FIG. 21 is a view similar to FIG. 19, showing the shutter in position for an actual exposure.

Referring to FIGS. 19 and 20, the pin 182 that limits the downward movement of shutter 174 is mounted at the end of a link 190 that is urged in a clockwise direction so that pin 182 seats in a slot 191 in plate 154. The end of link 190 opposite that connected to pin 182 is pivoted to a rod 192, the opposite end of the latter being pivoted to a lever 193. Lever 193 is pivoted on a pin 194 within the main housing 138, and a spring 195 encircling pin 194 has one leg 196 acting against a stop 197 and another leg 198 in contact with one edge of lever 193, causing the lever 193 to be urged clockwise about pin 194 and consequently pin 182 to be seated in slot 191. The end of lever 193 opposite that connected to rod 192 passes beneath a socket 199 for a flash blub. When no flash exposure is to be used, a flash bulb is not in the socket 199 and the parts are as shown in FIGS. 19 and 20, with pin 182 in slot 191 and limiting the clockwise movement of shutter 174 accordingly.

However, when a flash exposure is desired, a flash bulb 200 (FIG. 22) is inserted in socket 199. The prongs 201 of bulb 200 act on the free end of lever 193, moving it counterclockwise and lowering pin 182 to the position shown in FIG. 22. This permits shutter 174 to travel a greater distance when triggered by depressing plunger 156 and hence increases the time that aperture 180 is uncovered, thereby providing a longer period of exposure.

Figure 22:
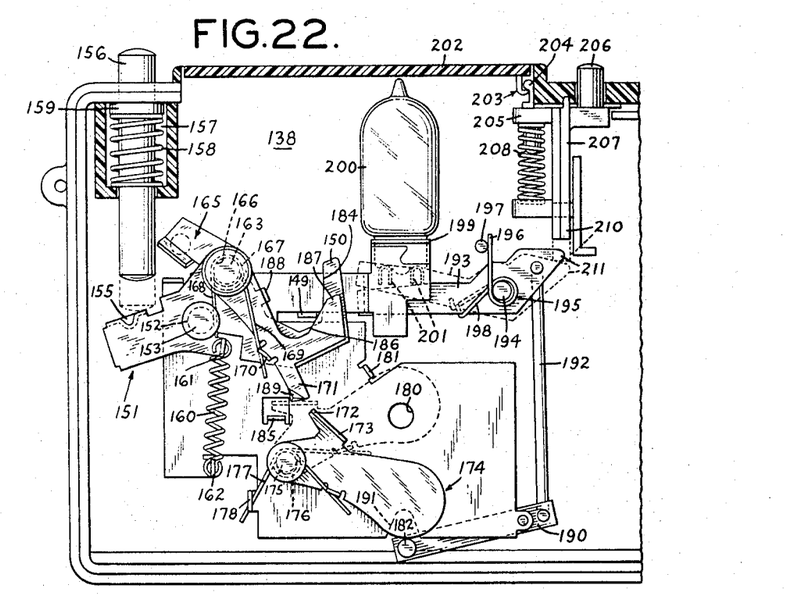
FIG. 22 is a view similar to FIG. 19, showing the operation of mechanism that increases the exposure time when a flash bulb is mounted in its socket.

Referring to FIG. 22, flash bulb 200 is located within a compartment in the camera to which access is had by a hinged cover 202 that is held closed by a latch 203. Latch 203 includes an element 204 mounted on an arm 205 that has a release button 206 connected to it, the button extending to the outside of the camera. Guide elements 207 are also connected to arm 205, and a spring 208 acts against a fixed bracket 209, urging arm 205 upwardly so that element 204 retains cover 202 closed.

After a flash exposure, with the camera inverted, latch 203 is released by pushing button 206, and at the same time the bottom 210 of guide 207 strikes a portion 211 of lever 193, turning it clockwise so that the free end of lever 193 acts to dislodge the terminals 201 of bulb 200, enabling the latter to fall out of the camera without requiring the operator to touch the hot, spent flash bulb. This pivotal action of liver 193 also returns pin 182 into slot 191 for daylight exposure conditions.

While the invention has been described in connection with specific embodiments thereof and in specific uses, various modifications thereof will occur to those skilled in the art without departing from the spirit and scope of the invention as set forth in the appended claims.

What is claimed is:

1. In a photographic camera, the combination comprising a main hou·ing; a front cover for said main housing; a light-admitting member supported by said front cover; a rear cover adapted to close a compartment adapted to support a film cartridge of the type including spaced parallel spools and a narrow compartment in the cartridge through which film having spaced metering holes is adapted to pass as it is wound off one spool onto the o·her; winding means within said camera adapted to cooperate with one of said spools to advance the film past a framing window within said cartridge; a one-piece metering plate mounted on and pivoted about a member within said camera which permits a portion of said plate to move in an arcuate path toward and away from said film, said metering plate being also slidable with respect to said member toward and away from the axis of said winding means; a finger attached to said plate portion; spring means attached to said plate for urging the end of said finger against said film so that it enters one of said metering holes on the edge of said film as it advances, said advancing film then sliding said finger and plate transversely toward said winding means; and locking means attached to said plate and driven by said sliding plate movement for interfering with the further action of said winding means when said film has moved to a position to frame an unexposed portion thereof in said window.

2. In a photographic camera, the combination comprising a main housing; a front cover for said main housing; a light-admitting member supported by said front cover; a rear cover adapted to close a compartment adapted to support a film cartridge of the type including spaced parallel spools and a narrow compartment in the cartridge through which film having spaced metering holes along its one edge is adapted to pass as it is wound off one spool onto the other; winding means within said camera adapted to cooperate with one of said spools to advance the film past a framing window within said cartridge; a one-piece metering plate mounted on and pivoted about the axis of said winding means and said plate being also slidable toward and away from said axis; a finger formed on said plate; spring means attached to said plate for urging said plate away from the axis of said winding means and the end of said finger against said film so that it enters one of said metering holes on the edge of said film as it advances, said advancing film then sliding said finger and plate transversely toward said winding means; and locking means attached to said plate and driven by said sliding plate movement for interfering with the further action of said winding means when said film has moved to a position to frame an unexposed portion thereof in said window.

3. In a photographic camera, the combination comprising a main housing; a front cover for said main housing; a light-admitting member supported by said front cover; a rear cover adapted to close a compartment adapted to support a film cartridge of the type including spaced parallel spools and a narrow compartment in the cartridge through which film having spaced metering holes along its one edge is adapted to pass as it is wound off one spool onto the other; winding means within said camera adapted to cooperate with one of said spools to provide a unidirectional movement of the film past a framing window within said cartridge; ratchet teeth on said winding means; a one-piece metering plate mounted on and pivoted about the axis of said winding means and slidable toward and away from said axis; a finger formed on said plate and contacting the edge of said film; spring means attached to said plate for urging the end of said finger against said film so that it enters one of said metering holes on the edge of said film as it advances, said film then sliding said finger and plate toward said winding means when said winding means is further operated; and locking means formed on said plate and driven by said sliding plate movement for interfering with the further action of said winding means when said film has moved to a position to frame an unexposed portion thereof in said window.

4. In a photographic camera, the combination comprising a main housing; a front cover for said main housing; a light-admitting member supported by said front cover; a rear cover adapted to close a compartment adapted to support a film cartridge of the type including spaced parallel spools and a narrow compartment in the cartridge through which film having spaced metering holes along its one edge is adapted to pass as it is wound off one spool onto the other; a shaft journaled in the top of said main housing and extending thereabove; a ratchet having peripheral and face teeth journaled on said shaft; a resilient pawl means fixed to said shaft for cooperation with said face teeth; driving means fixed to said ratchet adapted to cooperate with one of said spools; an arm connected to said shaft externally of said main housing to oscillate said shaft to advance said film past a framing window within said cartridge; a one-piece metering plate mounted on and pivoted about the axis of said shaft and slidable toward and away from said axis; a finger formed on said plate and contacting the edge of said film; spring means attached to said plate for urging the end of said finger against said film so that it enters one of said metering holes on the edge of said film, said film then sliding said plate toward said shaft when said shaft is oscillated; and locking means formed on said plate and driven by said sliding plate movement for interfering with the further action of said winding means when said film has moved to a position to frame an unexposed portion thereof in said window.

5. In a photographic camera, the combination comprising a main housing; a front cover for said main housing; a light-admitting member supported by said front cover; shutter means for controlling the passage of light from said light-admitting member to the inside of said camera; a trip lever for actuating said shutter means; a rear cover adapted to close a compartment adapted to support a film cartridge of the type including spaced parallel spools and a narrow compartment in the cartridge through which film having spaced metering holes along its one edge is adapted to pass as it is wound off one spool onto the other; winding means within said camera adapted to cooperate with one of said spools to advance the film past a framing window within said cartridge; a metering plate pivoted about a point within said camera which permits a portion of said plate to move toward and away from said film said plate being also transversely movable about said point so as to be movable toward and away from the axis of said winding means; a finger attached to said plate portion and contacting the edge of said film; spring means attached to said plate for urging the end of said finger against said film so that it enters one of said metering holes on the edge of said film, said film then moving said finger and plate toward said winding means when said winding means is operated; means operated by said plate movement for interfering with the further action of said winding means when said film has moved to a position to frame an unexposed portion thereof in said window; and means operated by said trip lever for removing the end of said finger from the hole in the edge of said film after said shutter means has been actuated.

6. In a photographic camera, the combination comprising a main housing; a front cover for said main housing; a light-admitting member supported by said front cover; shutter means for controlling the passage of light from said light-admitting member to the inside of said camera; a trip lever for actuating said shutter means; a rear cover adapted to close a compartment adapted to support a film cartridge of the type including spaced parallel spools and a narrow compartment in the cartridge through which film having spaced metering holes along its one edge is adapted to pass as it is wound off one spool onto the other; winding means within said camera adapted to cooperate with one of said spools to advance the film past a framing window within said cartridge; a metering plate pivoted about the axis of said winding means and movable toward and away therefrom; a finger attached to said plate and contacting the edge of said film; spring means attached to said plate for urging the end of said finger against said film so that it enters one of said metering holes on the edge of said film, said film then moving said finger and plate toward said winding means when said winding means is operated; means on said plate for interfering with the further action of said winding means when said film has moved to a position to frame an unexposed portion thereof in said window; a trip leg; means on said plate responsive to the actuation of said trip lever for providing a slight amount of slack in said film before said shutter is actuated actuation of said trip lever thereafter rendering said trip leg active; and means responsive to the activity of said trip leg for removing the end of said finger from the hole in the edge of said film.

7. In a photographic camera, the combination comprising a main housing; a front cover for said main housing; a light-admitting member supported by said front cover; shutter means for controlling the passage of light from said light-admitting member to the inside of said camera; a trip lever for actuating said shutter means; a rear cover adapted to close a compartment adapted to support a film cartridge of the type including spaced parallel spools and a narrow compartment in the cartridge through which film having spaced metering holes along its one edge is adapted to pass as it is wound off one spool onto the other; a shaft journaled in the top of said main housing and extending thereabove; a ratchet having peripheral and face teeth journaled on said shaft; a resilient pawl means fixed to said shaft for cooperation with said face teeth in a manner to provide a predetermined backlash; driving means fixed to said ratchet adapted to cooperate with one of said spools; an arm connected to said shaft externally of said main housing to oscillate said shaft to advance said film past a framing window within said cartridge; a metering plate pivoted about a pivot point within said camera which permits a portion of said plate to move in an arcuate path toward and away from said film, said metering plate being also movable transversely with respect to the axis of said winding means; a finger attached to said plate portion and contacting the edge of said film; spring means attached to said plate for urging the end of said finger against said film so that it enters one of said metering holes on the edge of said film, said film then moving said plate toward said shaft when said shaft is oscillated; means operated by said plate for engaging said peripheral ratchet teeth for preventing further oscillation of said shaft when said film has moved to a position to frame an unexposed portion thereof in said window; and means on said plate responsive to the actuation of said trip lever for actuating said ratchet in a reverse direction for a slight amount and then for thereafter removing the end of said finger from said hole in the edge of said film.

8. In a photographic camera, the combination comprising a main housing; a front cover for said main housing; a light-admitting member supported by said front cover; shutter means for controlling the passage of light from said light-admitting member to the inside of said camera; a trip lever for actuating said shutter means; a rear cover adapted to close a compartment adapted to support a film cartridge of the type including spaced parallel spools and a narrow compartment in the cartridge through which film having spaced metering holes along its one edge is adapted to pass as it is wound off one spool onto the other; winding means within said camera adapted to cooperate with one of said spools to advance the film past a framing window within said cartridge; a metering plate pivoted about a pivot point within said camera which permits a portion of said plate to move in an arcuate path toward and away from said rear cover, said metering plate being also movable transversely with respect to the axis of said winding means; a finger attached to said plate portion and contacting the edge of said film; spring means attached to said plate for urging the end of said finger against said film so that it enters one of said metering holes on the edge of said film, said film then moving said finger and plate toward said winding means when said winding means is operated; means operated by said plate for interfering with the further action of said winding means when said film has moved to a position to frame an unexposed portion thereof in said window; and means forming part of said metering plate for preventing the operation of said trip lever until said metering plate has been moved to a position to prevent further operation of said winding means.

9. In a photographic camera, the combination comprising a main housing; a front cover for said main housing; a light-admitting member supported by said front cover; shutter means for controlling the passage of light from said light-admitting member to the inside of said camera; a trip lever for actuating said shutter means; a rear cover adapted to close a compartment adapted to support a film cartridge of the type including spaced parallel spools and a narrow compartment in the cartridge through which film having spaced metering holes along its one edge is adapted to pass as it is wound off one spool onto the other; a shaft journaled in the top of said main housing and extending thereabove; a ratchet having peripheral and face teeth journaled on said shaft; a resilient pawl means fixed to said shaft for cooperation with said face teeth; driving means fixed to said ratchet adapted to cooperate with one of said spools; an arm connected to said shaft externally of said main housing to oscillate said shaft to advance said film past a framing window within said cartridge; a metering plate pivoted about the axis of said shaft and movable toward and away therefrom; a finger attached to said plate and contacting the edge of said film; spring means attached to said plate for urging the end of said finger against said film so that it enters one of said metering holes on the edge of said film, said film them moving said plate toward said shaft when said shaft is oscillated; means on said plate for engaging said peripheral ratchet teeth for preventing further oscillation of said shaft when said film has moved to a position to frame an unexposed portion thereof in said window; and means forming part of said metering plate for preventing the operation of said trip lever means until said metering plate has been moved to a position where the means on said plate engages said peripheral ratchet teeth.

10. In a photographic camera, the combination comprising a main housing; a front cover for said main housing; a light-admitting member supported by said front cover; a rear cover adapted to close a compartment adapted to support a film cartridge of the type including spaced parallel spools and a narrow compartment in the cartridge through which film having spaced metering holes along its one edge is adapted to pass as it is wound off one spool onto the other; winding means within said camera adapted to cooperate with one of said spools to provide a unidirectional movement of the film past a framing window within said cartridge; a metering plate pivoted about the axis of said winding means and movable toward and away therefrom; a finger attached to said plate and contacting the edge of said film; spring means normally urging the end of said finger against said film so that it enters a metering slot on the edge of said film, said film then moving said finger and plate toward said winding means when said winding means is operated; means on said plate for interfering with the further action of said winding means when said film has moved to a position to frame an unexposed portion thereof in said window; a member within said main housing having a fixed aperture through which light from said light-admitting member passes; a shutter comprising a spring-actuated, pivotally mounted plate having an elongated aperture therein adapted to become aligned with said fixed aperture when said shutter is released; a shutter release lever comprising a plate pivotally mounted on said shutter pivot and including a cam surface for releasing said shutter and an aperture so located that it becomes aligned with said fixed aperture before said shutter is released; and means on said shutter release lever for returning said shutter without uncovering said fixed aperture.

11. In a photographic camera, the combination comprising a main housing; a front cover for said main housing; a light-admitting member supported by said front cover; a rear cover adapted to close a compartment adapted to support a photographic film; a member within said main housing having a fixed aperture through which light from said light-admiting member passes; a shutter pivotally mounted within said camera normally retained in position to prevent light from said light-admitting member from passing through said fixed aperture; shutter operating means for moving said shutter to a limting stop and then returning so as to uncover said fixed aperture, the distance said shutter moves until it strikes said limiting stop determing the duration of exposure; a trip lever for actuating said shutter operating means; a compartment within said main housing including a socket for a flash bulb; a pair of spaced substantially parallel pivoted levers, the free end of one supporting said limiting stop and the free end of the other extending beneath said socket and in position to be acted upon by the base of a flash bulb when inserted in said socket; and means connecting the opposite ends of said parallel levers together, whereby upon the insertion of a flash bulb in said socket, said limiting stop is moved to a different location.

12. In a photographic camera, the combination comprising a main housing; a front cover for said main housing; a light-admitting member supported by said front cover; a rear cover adapted to close a compartment adapted to support a film cartridge of the type including spaced parallel spools and a narrow compartment in the cartridge through which film having spaced metering holes along its one edge is adapted to pass as it is wound off one spool onto the other; winding means within said camera adapted to cooperate with one of said spools to provide a unidirectional movement of the film past a framing window within said cartridge; a metering plate pivoted about the axis of said winding means and movable toward and away therefrom; a finger attached to said plate and contacting the edge of said film; spring means attached to said plate for urging the end of said finger against said film so that it enters one of said metering holes on the edge of said film; said film then moving said finger and plate toward said window means when said winding means is operated; means on said plate operated by said film driven plate movement for interfering with the further action of said winding means when said film has moved to a position to frame an unexposed portion thereof in said window; a member within said main housing having a fixed aperture through which light from said light-admitting member passes; a shutter pivotally mounted within said camera normally retained in position to prevent light from said light-admitting member from passing through said fixed aperture; shutter operating means for moving said shutter to a limiting stop and them returning so as to uncover said fixed aperture, the distance said shutter moves until it strikes said limiting stop determining the duration of exposure; a trip lever for actuating said shutter operating means; means for moving said limiting stop to thereby vary the amount of shutter movement so as to vary the exposure time; and means operated by said trip lever, for pivoting said metering plate about said axis to remove said finger from said hole after said shutter has been operated.

13. In a photographic camera, the combination comprising a main housing; a front cover for said main housing; a light-admitting member supported by said front cover; a rear cover adapted to close a compartment adapted to support a film cartridge of the type including spaced parallel spools and a narrow compartment in the cartridge through which film having spaced metering holes along its one edge is adapted to pass as it is wound off one spool onto the other; winding means within said camera adapted to cooperate with one of said spools to provide a unidirectional movement of the film past a framing window within said cartridge; a metering plate pivoted about the axis of said winding means and movable toward and away therefrom; a finger attached to said plate and contacting the edge of said film; spring means normally urging the end of said finger against said film so that it enters a metering slot on the edge of said film, said film then moving said finger and plate toward said winding means when said winding means is operated; means on said plate for interfering with the further action of said winding means when said film has moved to a position to frame an unexposed portion thereof in said window; a member within said camera having a fixed aperture for passing light from said light-admitting member; a shutter pivotally mounted within said camera normally retained in position to prevent light from said light-admitting member from passing through said fixed aperture; shutter operating means for moving said shutter to a limiting stop and then returning so as to uncover said fixed aperture, the distance said shutter moves until it strikes said limiting stop determining the duration of exposure; a trip lever for actuating said shutter operating means; means for moving said limiting stop to thereby vary the amount of shutter movement so as to vary the exposure time; and means forming part of said metering plate means for preventing the operation of said trip lever until said metering plate has been winding to a position to prevent further operation of said winding means.

14. In a photographic camera, the combination according to claim 5 wherein said means responsive to the operation of said trip lever includes a member on said lever for engaging a portion of said metering plate to pivot said plate about said point thereby removing the end of said finger from the slot in the edge of said film.

15. In a photographic camera, the combination comprising a main housing; a front cover for said main housing; a light-admitting member supported by said front cover; a rear cover adapted to close a compartment adapted to support a film cartridge of the type including spaced parallel spools and a narrow compartment in the cartridge through which film having spaced metering holes is adapted to pass as it is wound off one spool onto the other; winding means within said camera adapted to cooperate with one of said spools to provide a unidirectional movement of the film past a framing window within said cartridge; a metering plate pivoted about a pivot point within said camera which permits a portion of said plate to move in an arcuate path toward and away from said rear cover; a finger attached to said plate portion and arranged to contact said film; spring means normally urging the end of said finger against said film when said winding means is operated so that it enters a metering slot on the edge of said film when said film has been moved to a position to substantially frame an unexposed portion thereof in said window; shutter means for controlling the passage of light from said light-admitting member to the inside of said camera; shutter activating means including a trip lever; and means operated by said trip lever for pivoting said metering plate about said point to remove said finger from said slot after said shutter means has been actuated.

16. In a photographic camera, the combination according to claim 15 in which said shutter actuating means includes a trip leg pivotally mounted adjacent said trip lever about an axis perpendicular thereto said trip leg having means responsive to the operation of said trip lever for actuating said shutter means and means for thereafter pivoting said metering plate about said point to remove said finger from said slot.

17. In a photographic camera having a rear compartment adapted to support a film cartridge having spaced parallel spools and a narrow compartment through which film having spaced metering holes along one edge is adapted to pass as it is wound off one spool onto the other and winding means adapted to cooperate with one of said spools to advance the film past a framing window in said cartridge; the combination of shutter means, a trip lever for actuating said shutter means, a metering plate pivoted about a point within said camera which permits a portion of said plate to move in an arcuate path toward and away from said film, a finger attached to said plate portion, spring means attached to said plate for urging said finger against said film so that it enters one of said metering holes as said winding means is operated and before a picture is taken and means carried by said trip lever having resilient means directly connected to said trip lever for later supplying the force which removes said finger from said hole in the edge of said film after said shutter means has been actuated.

References Cited

UNITED STATES PATENTS

| 2,351,999 | 5/1944 | Nerwin | 95—31 |
| 2,478,309 | 8/1949 | Pask et al. | 95—60 |
| 2,738,476 | 3/1956 | Buquor | 240—13 |
| 3,088,389 | 5/1963 | Rigolini | 95—31 |
| 3,181,443 | 5/1965 | Lareau | 95—11.5 |
| 3,232,196 | 2/1966 | Sapp et al. | 95—31 |
| 3,237,542 | 3/1966 | Ataka | 95—31 |

NORTON ANSHER, *Primary Examiner.*

R. A. SCHROEDER, *Assistant Examiner.*

U.S. Cl. X.R.

95—11.5, 60

UNITED STATES PATENT OFFICE
CERTIFICATE OF CORRECTION

Patent No. 3,416,425    Dated December 17, 1968

Inventor(s) Venerio J. Rigolini

It is certified that error appears in the above-identified patent and that said Letters Patent are hereby corrected as shown below:

Column 1, line 52, the word "At" should be --A--.

Column 5, line 25, reference numeral "205" should be --105--.

Column 6, line 41, the word "elemetns" should be --elements--.

Column 6, line 42, the word "wil" should be --will--.

Column 6, line 55, the word "pring" should be --spring--.

Column 7, line 61, the word "its" should be --it--.

Column 8, line 42, the word "liver" should be --lever--.

Column 14, line 14, the word "winding" should be --moved--.

Signed and sealed this 28th day of March 1972.

(SEAL)
Attest:

EDWARD M. FLETCHER, JR.
Attesting Officer

ROBERT GOTTSCHALK
Commissioner of Patents